United States Patent
Bolen et al.

(10) Patent No.: US 12,314,371 B2
(45) Date of Patent: May 27, 2025

(54) SYSTEMS AND METHODS FOR PERIPHERAL DEVICE SECURITY

(71) Applicant: EMC IP Holding Company LLC, Hopkinton, MA (US)

(72) Inventors: Austin Patrick Bolen, Austin, TX (US); Chandrashekar Nelogal, Round Rock, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 354 days.

(21) Appl. No.: 17/383,881

(22) Filed: Jul. 23, 2021

(65) Prior Publication Data

US 2023/0025979 A1    Jan. 26, 2023

(51) Int. Cl.
  *G06F 21/44*    (2013.01)
  *G06F 13/42*    (2006.01)
  *G06F 21/85*    (2013.01)

(52) U.S. Cl.
  CPC .......... *G06F 21/44* (2013.01); *G06F 13/4208* (2013.01); *G06F 21/85* (2013.01)

(58) Field of Classification Search
  CPC ....... G06F 21/44; G06F 13/4208; G06F 21/85
  USPC .......................................................... 726/18
  See application file for complete search history.

(56) References Cited

U.S. PATENT DOCUMENTS

| | | | |
|---|---|---|---|
| 7,877,788 B1 * | 1/2011 | Topp ....................... | G06F 21/44 726/17 |
| 9,576,270 B1 | 2/2017 | Afshar | |
| 10,242,176 B1 * | 3/2019 | Sathyanarayana ...... | G06F 13/36 |
| 10,832,361 B2 | 11/2020 | Mowatt et al. | |
| 10,848,972 B2 | 11/2020 | Veramendi | |
| 11,403,384 B2 | 8/2022 | Dreger | |
| 12,099,850 B2 | 9/2024 | Jreij | |
| 2009/0172770 A1 | 7/2009 | Sandage et al. | |
| 2014/0351654 A1 * | 11/2014 | Zhang ................. | H04L 41/0663 714/43 |
| 2017/0094133 A1 | 3/2017 | Hamsici | |
| 2018/0285967 A1 | 10/2018 | Gilbey et al. | |
| 2018/0349314 A1 | 12/2018 | Angus et al. | |
| 2019/0281449 A1 * | 9/2019 | Luo ........................ | H04L 63/06 |
| 2019/0352933 A1 | 11/2019 | Tartal | |
| 2022/0020082 A1 | 1/2022 | Kataoka et al. | |
| 2022/0027522 A1 * | 1/2022 | Kasheshian ........... | G06F 21/552 |
| 2022/0124118 A1 * | 4/2022 | Bangalore Sathyanarayana ......... H04L 63/1416 |
| 2022/0219564 A1 | 7/2022 | Aoto et al. | |
| 2022/0256306 A1 | 8/2022 | Perraud | |

(Continued)

OTHER PUBLICATIONS

Austin Bolen et al. (Mar. 19, 2019). "PCIe Hot-Plug and Error Handling for NVMe" [PowerPoint slides]. 2019 NVMe™ Annual Members Meeting and Developer Day, NVM Express (25 pages).

*Primary Examiner* — Moeen Khan
(74) *Attorney, Agent, or Firm* — Chamberlain, Hrdlicka, White, Williams & Aughtry; Aly Z. Dossa

(57) ABSTRACT

A method for authenticating a peripheral device, that includes detecting, by a baseboard management controller (BMC), a presence of the peripheral device, receiving authentication credentials from the peripheral device, making a determination, based on the authentication credentials, that the peripheral device is authentic, and sending, in response to the determination, a command to open a peripheral communication channel with the peripheral device.

9 Claims, 6 Drawing Sheets

(56) References Cited

U.S. PATENT DOCUMENTS

2023/0237185 A1 7/2023 Kumar et al.
2024/0111544 A1 4/2024 Jreij

* cited by examiner

SYSTEMS AND METHODS FOR PERIPHERAL DEVICE SECURITY

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, embodiments relate to a method for authenticating a peripheral device, that includes detecting, by a baseboard management controller (BMC), a presence of the peripheral device, receiving authentication credentials from the peripheral device, making a determination, based on the authentication credentials, that the peripheral device is authentic, and sending, in response to the determination, a command to open a peripheral communication channel with the peripheral device.

In general, in one aspect, embodiments relate to a non-transitory computer readable medium that includes instructions which, when executed by a computer processor, enables the computer processor to perform a method for authenticating a peripheral device, that includes detecting, by a baseboard management controller (BMC), a presence of the peripheral device, receiving authentication credentials from the peripheral device, making a determination, based on the authentication credentials, that the peripheral device is authentic, and sending, in response to the determination, a command to open a peripheral communication channel with the peripheral device.

In general, in one aspect, embodiments relate to a node, that includes a processor, a peripheral device, a peripheral root port, a system management bus (SMBus), and a baseboard management controller (BMC), where the BMC is configured to perform a method for authenticating the peripheral device, that includes detecting a presence of the peripheral device, receiving authentication credentials from the peripheral device, making a determination, based on the authentication credentials, that the peripheral device is authentic, and sending, in response to the determination, a command to open a peripheral communication channel with the peripheral device.

Other aspects of the invention will be apparent from the following description and the appended claims.

DETAILED DESCRIPTION

Figure 1:
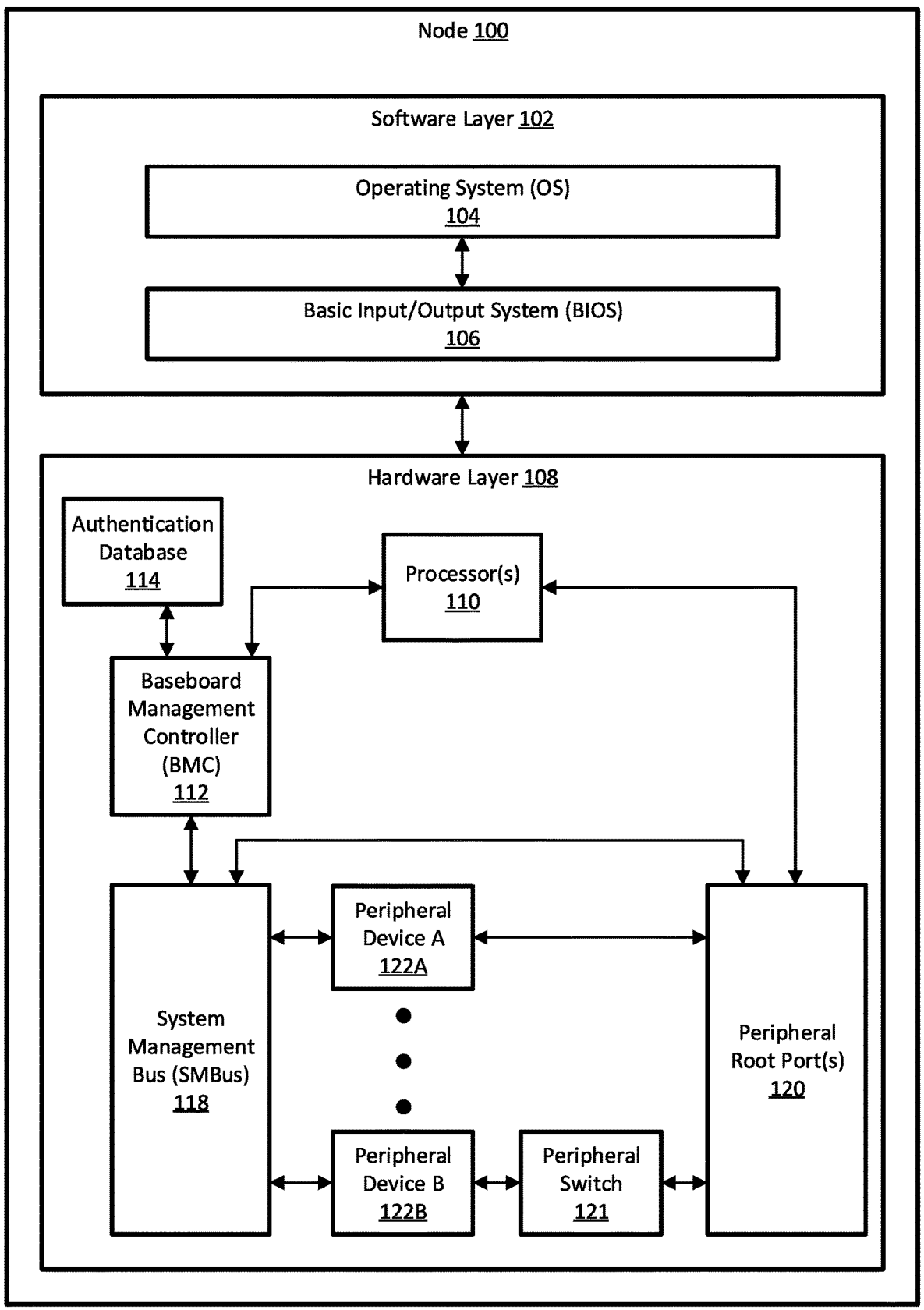
FIG. 1 shows a diagram of node, in accordance with one or more embodiments of the invention.

In general, embodiments of the invention relate to systems and methods for quarantining peripheral devices until those peripheral devices can be authenticated. When a peripheral device is operatively connected to a host computing device, certain precautions should be taken to avoid granting that peripheral device access to the host's components and systems. Potentially, a peripheral device may be able to initiate any number of malicious actions (e.g., inject malicious code, execute malware, etc.) on the host's system if the peripheral device is not quarantined and only traditional protocols are utilized.

As described herein, in one or more embodiments of the invention, a method may be implemented to initially limit communications (e.g., data transfer) with a peripheral device. Instead of allowing full access to all of a host's system, a peripheral device may, by default, be quarantined and only allowed to communicate certain information with one or more specific components of the host. The specific host components may then use those narrower channels of communication to verify the peripheral device's authenticity. And, only once the peripheral device's authenticity is verified, does the host remove the peripheral device from quarantine and allow for full access to the host's system. Accordingly, a malicious peripheral device is denied the ability to infect a host via simply mechanical insertion into the larger system.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details, known to those of ordinary skill in the art, may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

FIG. 1 shows a diagram of node, in accordance with one or more embodiments of the invention. In one or more embodiments of the invention, a node (e.g., node (100)) is a computing device (not shown). In one or more embodiments of the invention, a computing device includes one or more processor(s) (e.g., processor(s) (110)), memory (not shown), and persistent storage (not shown). The persistent storage (and/or memory) may store computer instructions (e.g., computer code) which, when executed by the processor(s) of the computing device, cause the computing device to issue one or more requests and to receive one or more responses. Non-limiting examples of a computing device include a mobile phone, tablet computer, laptop computer, desktop computer, server, distributed computing system, or cloud resource. In one or more embodiments of the invention, the node (100) may include a software layer (e.g., software layer (102)) and a hardware layer (e.g., hardware layer (108)). Each of these components is described below.

In one or more embodiments of the invention, a software layer (e.g., software layer (102)) is a collection of virtual software components (e.g., sets of instructions) executing on one or more processor(s) (110). The software layer (102) may include a user space (not shown), an OS (104), and/or a BIOS (106). Each of these components is described below.

In one or more embodiments of the invention, OS (e.g., OS (104)) is software executing on the node (100). In one embodiment of the invention, an OS (104) coordinates operations between software executing in user space (not shown) and the BIOS (106) to facilitate the proper use of the components of the hardware layer (108) (e.g., processor(s) (110), Peripheral Device A (122A)). In one or more embodiments of the invention, the OS (104) allows for the creation of user space (not shown) that generally provides a virtual space in which user-initiated software executes. In one embodiment of the invention, OS (104) does not have direct access to underlying hardware components (e.g., those of hardware layer (108)). Instead, the OS software must provide commands and/or requests to the BIOS (106), which coordinates the exchange of information between hardware components and the OS (104).

In one or more embodiments of the invention, a BIOS (e.g., BIOS (106)) is firmware executing on the node (100) used to initialize hardware components (e.g., peripheral device A (122A), peripheral device B (122B)) prior to the OS (104) initializing. In one or more embodiments of the invention, the BIOS (106) may be a unified extensible firmware interface (UEFI) or similar firmware for initializing hardware. The BIOS (106) may coordinate operations between software executing in OS (104) and the hardware layer (108) to facilitate the proper use of that hardware. Specifically, the BIOS (106) may be firmware that interacts with a baseboard management controller (BMC) (e.g., BMC (112)) and/or one or more peripheral root port(s) (e.g., peripheral root port(s) (120))).

In one or more embodiments of the invention, a hardware layer (e.g., hardware layer (108)) is a collection of physical components configured to perform the operations of the node (100) and/or otherwise execute the software of the node (100) (e.g., OS (104), BIOS (106)). The hardware layer (108) may include one or more processor(s) (110), a baseboard management controller (BMC) (112), an authentication database (114), a system management bus (SMBus) (118), one or more peripheral root port(s) (120), and one or more peripheral devices (e.g., peripheral device A (122A), peripheral device B (122B)). Each of these components is described below.

In one or more embodiments, a processor (e.g., processor(s) (110)) is an integrated circuit for processing instructions (e.g., those of node (100) software (e.g., OS (104), BIOS (106)), and/or those received via a communication interface (not shown). In one embodiment, a processor (110) may be one or more processor cores or processor micro-cores.

In one or more embodiments of the invention, a baseboard management controller (BMC) (e.g., BMC (112)) is a computing device (including its own processor (not shown), memory (not shown), and executes its own OS (not shown)) perform operations related to system management (e.g., of other hardware components) and/or monitors the status (e.g., "health") of other hardware components. Further, the BMC (112) may be configured to communicate with other hardware components (e.g., processor(s) (110), peripheral device(s) (122A, 122B), peripheral root port(s) (120)) via one or more communication interfaces and protocols. As an example, BMC (112) may communicate via the SMBus (118) and/or the peripheral root port (126) using their corresponding protocols.

In one or more embodiments of the invention, an authentication database (e.g., authentication database (114)) is a collection of information (i.e., data) that is used to authenticate one or more peripheral device(s) (e.g., 122A, 122B). The authentication database (114) may include one or more public keys and/or private keys which may be used to match with corresponding public keys and/or private keys of a peripheral device (e.g., 122A, 122B). Additionally, the authentication database (114) may act as a root certificate authority that may generate certificates that certify the authenticity of one or more peripheral device(s) (e.g., 122A, 122B).

In one or more embodiments of the invention, a system management bus (SMBus) (e.g., SMBus (118)) is a system used for sending and receiving data relating to the management of hardware layer (108) devices. In one or more embodiments of the invention, an SMBus (118) allows for communication via an interface and protocol (e.g., inter-integrated circuit ($I^2C$)) that is commonly recognized by the devices utilizing the bus. Additionally, the protocol used to communicate over the SMBus (118) may allow for only specific types of data and configurations, thereby eliminating potential security concerns with new and/or unknown devices as those devices cannot initiate malicious actions over the limited SMBus (118).

In one or more embodiments of the invention, a peripheral root port (e.g., peripheral root port(s) (120)) is an interface that allows for communication (i.e., data flow) between peripheral devices (e.g., 122A, 122B) and other system components (e.g., processor(s) (110), BMC (112), etc.). In one or more embodiments of the invention, a peripheral root port (120) is a computing device and may be implemented as part of one or more processor(s) (110), or a peripheral root port (120) may be implemented as an independent integrated circuit (e.g., an application specific integrated circuit (ASIC), field programmable gate array (FPGA), etc.).

In one or more embodiments of the invention, a peripheral root port (120) may allow for one or more peripheral communication channels (e.g., data, management, status channels) and/or one or more peripheral communication types (e.g., data transfer, vendor defined messages (VDM), identifying information, etc.). Further, peripheral root port(s) (120) may include abilities to act as a system firmware intermediary (SFI) that intercepts, modifies, filters, forwards, and/or otherwise alters data emanating from (or destined to) a peripheral device (e.g., 222A, 222B) based on those peripheral communication channels and/or peripheral communication types. Further, in one or more embodiments of the invention, a peripheral root port (120) may be configured to block (i.e., filter) all traffic to a peripheral device (122A, 122B) regardless of peripheral communication channel and/or peripheral communication type. As a non-limiting example, a peripheral root port (120) may block communication over all peripheral communication channels except a "management channel". As another non-limiting example, a peripheral root port (120) may reject, block, and/or otherwise deny all messages to and from a peripheral device (e.g., 122A, 122B) unless those messages are "vendor defined messages" (VDM). In one or more embodiments of the invention, filtering of peripheral communication channels and/or peripheral communication may be enabled and/or disabled by toggling a switch within the peripheral root port (120).

In one or more embodiments of the invention, a peripheral switch (121) may be operatively connected to one or more peripheral root port(s) (120) to increase the number of peripheral interfaces in the node (100). The peripheral switch (121) may include one or more peripheral downstream port(s) (not shown) to interface with one or more peripheral devices (e.g., 122A, 122B), respectively. As a non-limiting example, if a node (100) includes only a single peripheral root port (e.g., 120), but two peripheral devices (e.g., 122A, 122B) are desired, a peripheral switch (e.g., 121) that offers (at least) two peripheral downstream ports may be added to the node (100) and operatively connected to the single peripheral root port (e.g., 120). Accordingly, using the peripheral switch (e.g., 121), two peripheral devices (e.g., 122A, 122B) may be operatively connected to the node (100) (via peripheral switch (121)) despite only a single peripheral root port (e.g., 120) initially existing in the node (100). As another non-limiting example, if the node (100) includes five peripheral root ports (e.g., 120) with five peripheral interfaces but ten peripheral devices (e.g., 122A, 122B) are desired, a six-port peripheral switch (e.g., 121) may be added to one of the five peripheral downstream ports (e.g., 120). Once added, four (of the five) peripheral root ports (e.g., 120) would be open and all six of the peripheral downstream ports of the peripheral switch (e.g., 121) would be open, thereby allowing for ten peripheral devices (e.g., 122A, 122B) to be simultaneously operatively connected. One of ordinary skill in the art, having the benefit of this detailed description, would appreciate the usage of a peripheral switch (121) to increase the number of available peripheral interfaces.

In one or more embodiments of the invention, each peripheral downstream port (not shown) included in a peripheral switch (121) may be controlled independently from the peripheral root port (120) to which the peripheral switch (121) is operatively connected. That is, each peripheral downstream port (not shown) within the peripheral switch (121) may include its own toggle to enable and/or disable filtering of peripheral communication channels and/or peripheral communication types.

In one or more embodiments of the invention, a peripheral device (e.g., peripheral device A (122A), peripheral device B (122B)) is hardware computing device. Non-limiting examples of a peripheral device (e.g., 122A, 122B) include a graphical processing unit (GPU), a processor, a network interface controller (NIC), a storage device (e.g., memory), and/or any other hardware computing device. Peripheral devices (e.g., 122A, 122B) may be operatively connected to the peripheral root port via one or more common interfaces and protocols (e.g., peripheral component interconnect (PCI), PCI express (PCIe), M.2, serial advanced technology attachment (SATA), etc.). Additionally, as shown in FIG. 1, peripheral devices (e.g., 122A, 122B) may be operatively connected to the SMBus (118) via a common interface and protocol (e.g., inter-integrated circuit ($I^2C$)).

While FIG. 1 shows a specific configuration of a system, other configurations may be used without departing from the scope of the invention. Accordingly, embodiments disclosed herein should not be limited to the configuration of devices and/or components shown in FIG. 1.

Figure 2:
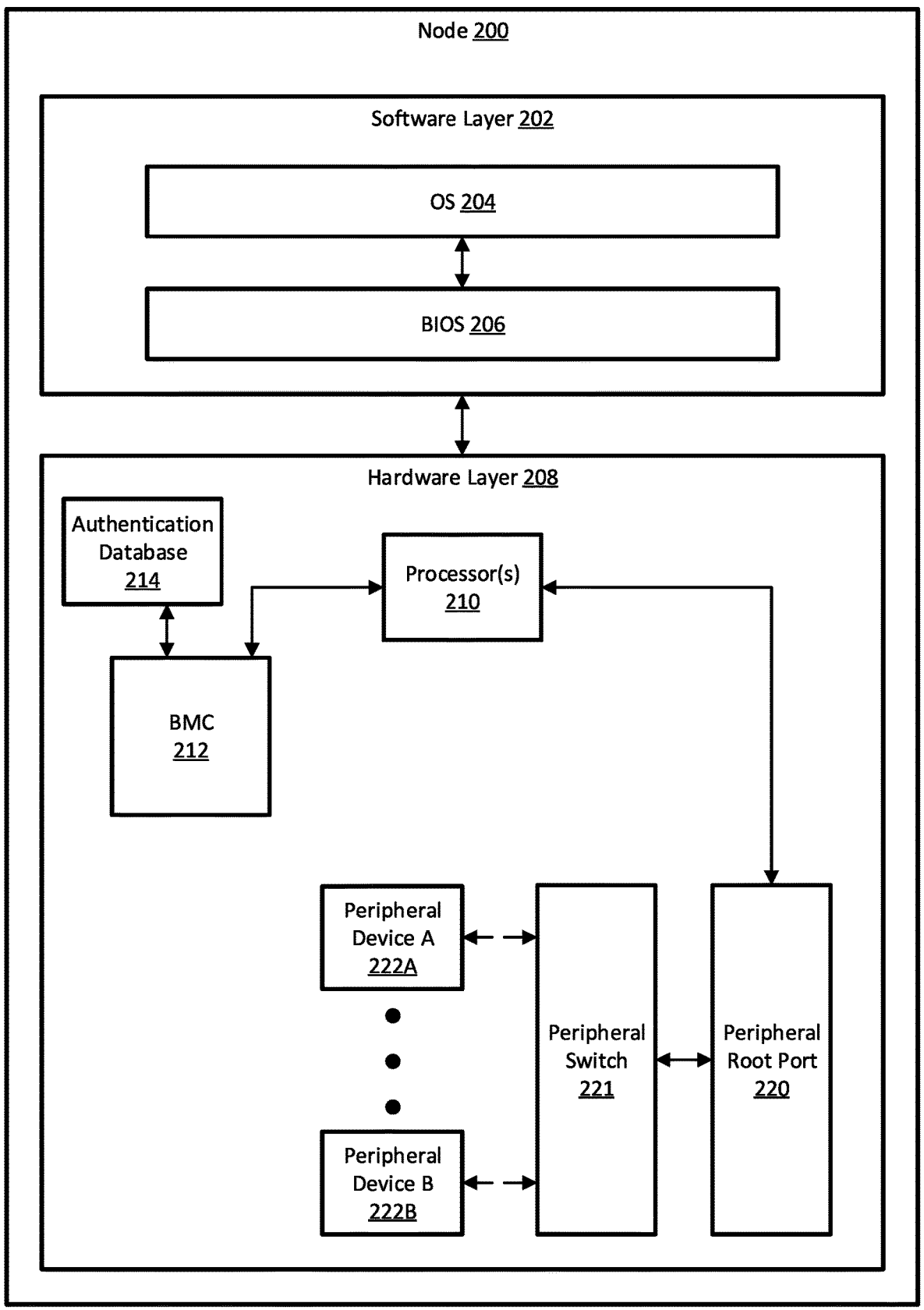
FIG. 2 shows a diagram of node, in accordance with one or more embodiments of the invention.

FIG. 2 shows a diagram of node, in accordance with one or more embodiments of the invention. Similar to FIG. 1, the node (200) is a computing device and may include a software layer (e.g., software layer (202)) and a hardware layer (e.g., hardware layer (208)). Similarly named parts shown in FIG. 2 have all of the same properties and functionalities as described above in FIG. 1. Accordingly, only additional properties and functionalities will be described below.

In one or more embodiments of the invention, an SMBus (not shown) may be absent from the node (200). Accordingly, in one or more embodiments of the invention, the BMC (212) may only communicate with one or more peripheral devices (e.g., peripheral device A (222A), peripheral device B (222B)) via interaction with a processor (e.g., processors(s) (210)), peripheral root port (220), and/or peripheral switch (221) (if present). In one or more embodiments of the invention, when the BMC (212) communicates using a peripheral root port (220), software executing in the OS (204) or the BIOS (206) may be utilized (via processor(s) (210)) to transfer, facilitate, and/or otherwise perform the actions commanded by the BMC (212). The BMC (212) may communicate with the authentication database (214) in a similar manner as discussed in the description of FIG. 1.

In one or more embodiments of the invention, a single peripheral root port (220) is present that is operatively connected to a peripheral switch (221). In turn, the peripheral switch (221) is operatively connected to two or more peripheral devices (222A, 222B). Accordingly, as a non-limiting example, the peripheral root port (220) may have all filtering capabilities disabled by default (i.e., allowing all peripheral communication channels and peripheral communication types). However, each peripheral downstream port (not shown) of the peripheral switch (221) will have filtering enabled by default. Thus, in one or more embodiments of the invention, if a peripheral switch (221) is present, the external peripheral root port (220), to which the peripheral switch (221) is operatively connected, may not directly quarantine one or more peripheral device(s) (222A, 222B) but may rely on one or more peripheral downstream port(s) (not shown) to perform those functions.

While FIG. 2 shows a specific configuration of a system, other configurations may be used without departing from the scope of the invention. Accordingly, embodiments disclosed herein should not be limited to the configuration of devices and/or components shown in FIG. 2.

Figure 3:
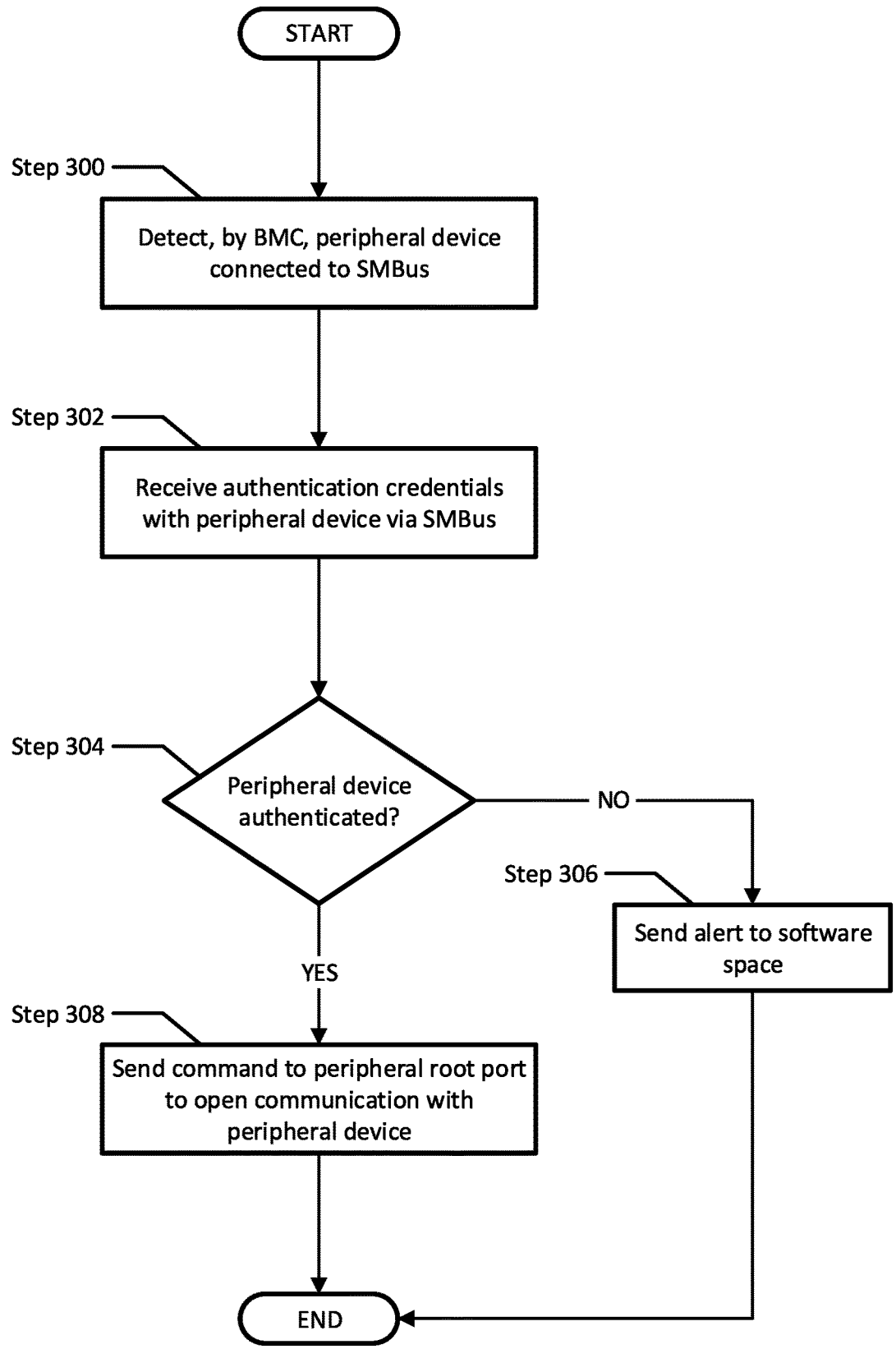
FIG. 3 shows a flowchart of a method of authenticating a peripheral device, in accordance with one or more embodiments of the invention.

FIG. 3 shows a flowchart of a method of authenticating a peripheral device, in accordance with one or more embodiments of the invention. All or a portion of the method shown in FIG. 3 may be performed by one or more components of the BMC. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 300, a BMC detects that a peripheral device is connected to the node via an SMBus. The BMC may detect the presence of the peripheral device via one or more conductive pathways that operably link the peripheral device to the BMC (e.g., a "physical presence pin" activated by the peripheral device). Further, the BMC may detect the presence of a peripheral device via a software mechanism that informs the BMC of the peripheral device's presence and/or via repeatedly attempting to access each peripheral device (e.g., "polling")

In one or more embodiments of the invention, the BMC detects the presence of any peripheral devices upon initial boot of the BMC (and node generally). Further, the BMC may detect the presence of a peripheral device when that peripheral device is added to the node while the node is already powered and active (i.e., "hot plugging").

Further, in one or more embodiments of the invention, by default all communication (i.e., data transfer) between a peripheral device and the peripheral root port (or peripheral switch) is disabled, until the peripheral root port (or peripheral switch) affirmatively allows communication with any one peripheral device (i.e., peripheral devices are initially quarantined). Accordingly, upon initial insertion of the peripheral device into the node (or upon initialization of the node), all communication between the peripheral device and the peripheral root port (or peripheral switch) is blocked. Thus, the peripheral device is not able to send or receive communication with the peripheral root port (or peripheral switch) and any attempts by the peripheral device to inject any code into the node (via the peripheral root port) are prevented.

In Step 302, the BMC receives authentication credentials with the peripheral device. In one or more embodiments of the invention, the BMC requests the authentication credentials (e.g., some combination of public keys, private keys, and/or existing certificates) to verify the peripheral device's authenticity (e.g., that the peripheral device is not malicious). When received, the BMC attempts to match the peripheral device's keys and/or certificates against a known key stored in the authentication database (e.g., asymmetric authentication) and/or whether the provided certificate is trustworthy. One of ordinary skill in the art, having the benefit of this detailed description, would appreciate the basic methods for verifying a peripheral device's authenticity via some form of cryptographic authentication.

Further, in one or more embodiments of the invention, the peripheral device may send other identifying information about the peripheral device. Non-limiting examples of the identifying information include a unique identifier, serial number, manufacturer, model, and manufacture date. Although the BMC may receive identifying information from the peripheral device, the BMC may assume the provided identifying information is false until the peripheral device's authenticity is verified.

In Step 306, the BMC determines whether the peripheral device is authenticated. If the BMC is not able to verify the authenticity of the peripheral device (304—NO), the BMC will not authenticate the peripheral device and proceed to Step 306. Alternatively, if the BMC is able to verify that the authenticity of the peripheral device (304—YES), the BMC then authenticates the peripheral device (304—YES) and proceeds to Step 308.

In Step 306, the BMC sends an alert to the BIOS (or OS) that the peripheral device has not been authenticated. The alert may take the form of a message that includes, but is not limited to, the peripheral device's identifying information (even though it may be fraudulent), the port occupied by the peripheral device, and the reason for the alert (i.e., authentication failure). Further, additionally or alternatively, the BMC may send an alert to the root port (or peripheral switch) regarding the failure to authenticate the peripheral device.

In one or more embodiments of the invention, the BMC may not perform any action upon failure to authenticate the peripheral device (i.e., not send any alerts or messages to other components of the node).

In Step 308, the BMC sends a command to the root port (or peripheral switch) to open one or more peripheral communication channels with the peripheral device. The command to the root port (or peripheral switch) may specify unmasking an "interrupt" (e.g., a message to the BIOS or OS regarding the insertion of the peripheral device). In turn, the peripheral root port (or peripheral switch) may communicate with the peripheral device without further blocking, and may inform other components of the node that the peripheral device is operational. Communication between the BMC and the peripheral switch may occur over an SMBus (if present), the node processor (e.g., using software layer services to facilitate the communication), and/or via some other form of communication operatively connecting the BMC and the peripheral root port (or peripheral switch).

Further, upon successful authentication of the peripheral device, the BMC may issue a certificate to the peripheral device verifying the authenticity of the peripheral device. That is, the BMC may act a certificate authority and issue a certificate which may be stored by the peripheral device and used for future authentication purposes.

Figure 4:
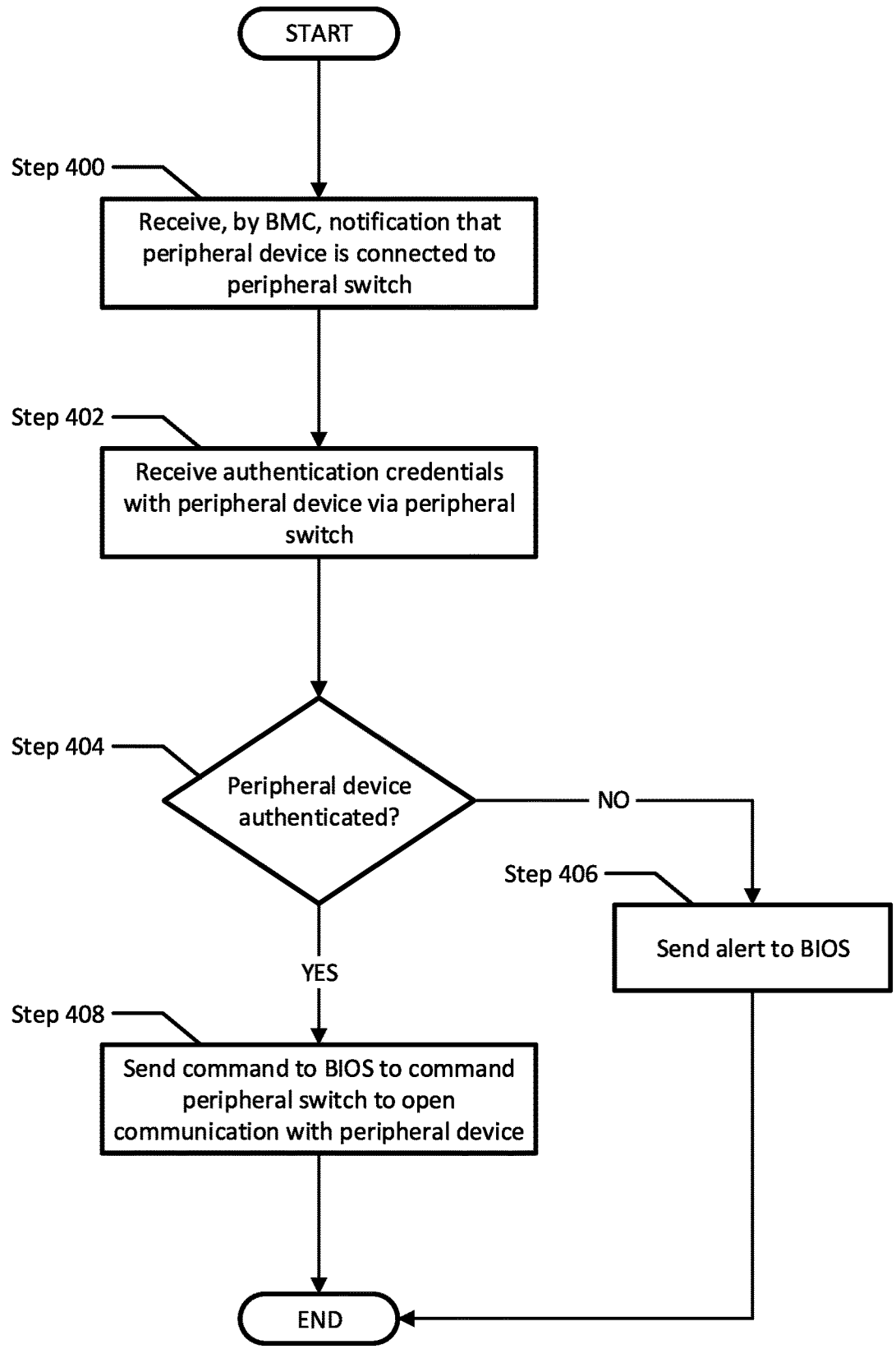
FIG. 4 shows a flowchart of a method of authenticating a peripheral device, in accordance with one or more embodiments of the invention.

FIG. 4 shows a flowchart of a method of authenticating a peripheral device, in accordance with one or more embodiments of the invention. All or a portion of the method shown in FIG. 4 may be performed by one or more components of the BMC. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The process of Step 400 is substantially similar to the process described in Step 300, except with the differences described below. In Step 400, a BMC receives notification that a peripheral device is connected to the node via a peripheral switch and/or via the physical presence pin of the peripheral port (operatively connected outside of the SMBus). Communication between the BMC and the peripheral switch may occur over an SMBus (if present), the node processor (e.g., using software layer services to facilitate the communication), and/or via some other form of communication operatively connecting the BMC and the peripheral switch.

In one or more embodiments of the invention, the peripheral switch may perform limited communications with the peripheral device over one or more peripheral communication channels and/or using one or more peripheral communication types. That is, the peripheral switch may block all communication from the peripheral device, except for communication coming over certain peripheral communication channels (e.g., management, status channels) and/or certain peripheral communication types (e.g., a vendor defined message (VDM), identifying information, etc.).

Upon insertion of a peripheral device into the node (or upon node initialization), the peripheral switch may send a message to the BMC that a peripheral device is inserted into the node. The message to the BMC (from the peripheral switch) may include, but is not limited to, the peripheral device's identifying information, the port used by the peripheral device, and which peripheral communication channels are open to the peripheral device.

Accordingly, upon initial insertion of the peripheral device into the node (or upon initialization of the node), most communication between the peripheral device and the peripheral switch is blocked. Thus, the peripheral device is not able to send or receive most communication with the peripheral switch and any attempts by the peripheral device to inject any code into the node (via the peripheral switch) are prevented. Further, the peripheral switch may be configured, by default, to mask (e.g., block, not send) any interrupts to the BIOS or OS regarding the peripheral device.

The process of Step 402 is substantially similar to the process described in Step 302, except with the differences described below. In Step 402, the BMC receives authentication credentials with the peripheral device. The BMC may receive authentication credentials with the peripheral device utilizing one of the available peripheral communication channels and/or types of communication available. As a non-limiting example, the BMC may request authentication credentials utilizing a VDM, which the peripheral switch will allow to pass to and from the peripheral device. Accordingly, the peripheral device may respond to the BMC's request by sending the authentication credentials to the BMC by labeling the data as a VDM.

The process of Step 404 is substantially similar to the process described in Step 304, except with the differences described below. In Step 404, if the BMC is not able to verify the authenticity of the peripheral device (404—NO), the BMC will not authenticate the peripheral device and proceed to Step 406. Alternatively, if the BMC is able to verify that the authenticity of the peripheral device (404—YES), the BMC then authenticates the peripheral device (404—YES) and proceeds to Step 408.

In Step 406, the BMC determines whether the peripheral device is authenticated. The process of Step 406 is substantially similar to the process described in Step 306.

The process of Step 408 is substantially similar to the process described in Step 308, except with the differences described below. In Step 408, the BMC sends a command to the peripheral switch to open one or more peripheral communication channels with the peripheral device. Communication between the BMC and the peripheral switch may occur over an SMBus (if present), the node processor (e.g., using software layer services to facilitate the communication), and/or via some other form of communication operatively connecting the BMC and the peripheral switch. As a non-limiting example, the BMC may instruct the BIOS that the peripheral switch may open one or more peripheral communication channels. And, in turn, the BIOS may send a command to the peripheral switch to open the peripheral communication channels specified by the BMC.

Figure 5:
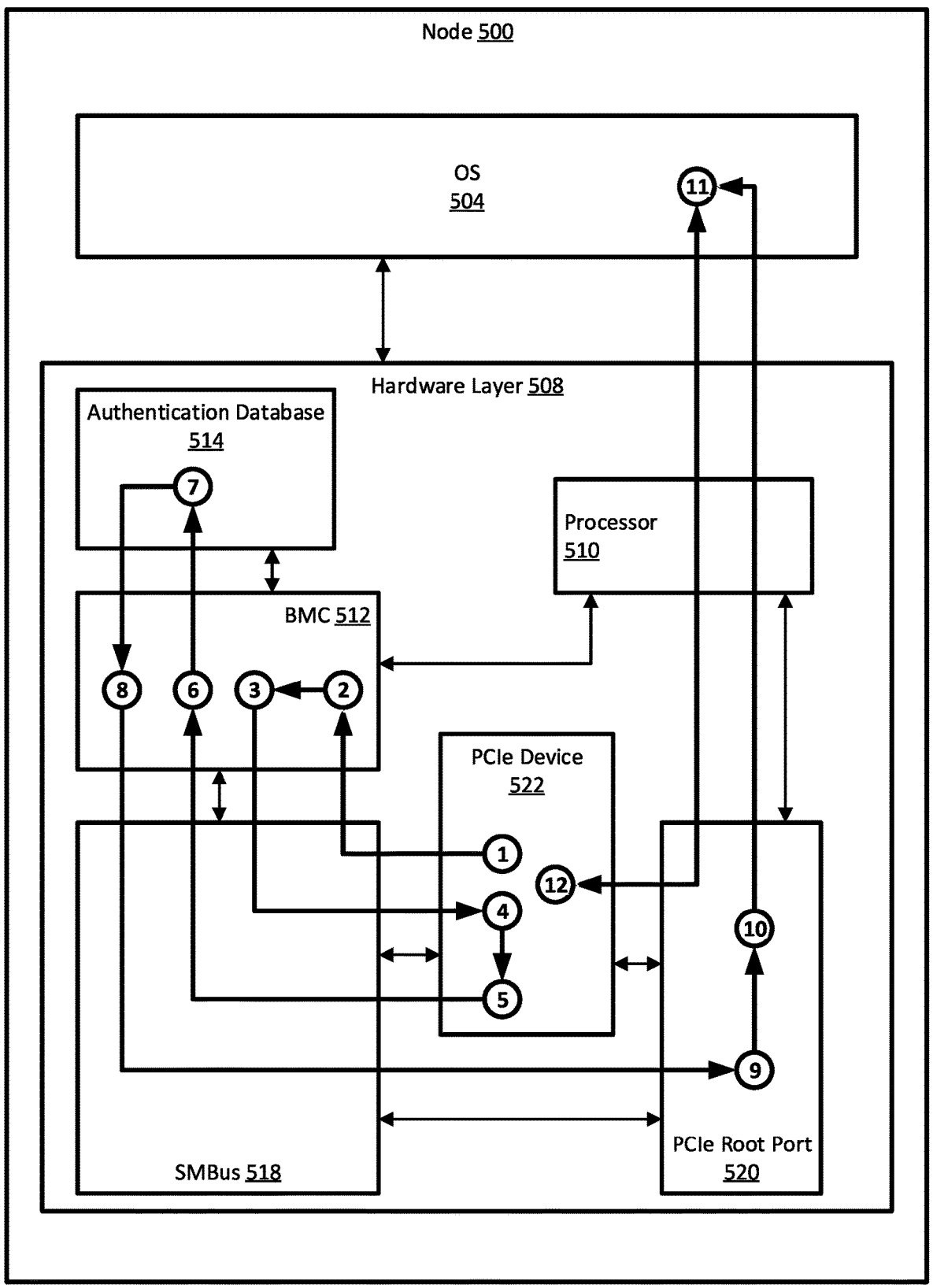
FIG. 5 shows an example of a method of authenticating a peripheral device, in accordance with one or more embodiments of the invention.

FIG. 5 shows an example of a method of authenticating a peripheral device, in accordance with one or more embodiments of the invention. The following use case is for explanatory purposes only and not intended to limit the scope to this embodiment.

In FIG. 5, consider a scenario in which—

At (1), a PCIe device (522) is physically inserted into the hardware layer (508) of the node (500). The node (500) is already powered and active (e.g., the PCIe device (522) is "hot plugged" in the node (500)). The insertion of the PCIe device (522) causes the physical presence pin of the PCIe port to become active. All communication between the PCIe device (522) and the PCIe root port (520) are disabled by default.

At (2), the BMC (512) detects that the physical presence pin of the PCIe port went from an inactive state to an active state. In turn, at (3), the BMC (512) generates a request for the authentication credentials and identifying information of the PCIe device (522). The BMC (512) sends the request to the PCIe device (522) via the SMBus (518).

At (4), the PCIe device (522) receives the request for authentication credentials and identifying information from the BMC (512). In turn, at (5), PCIe device (522) generates a message with a certificate, a manufacturer, and a model number and sends that message to the BMC (512) via the SMBus (518).

At (6), the BMC (512) receives the message with the certificate, manufacturer, and model number from the PCIe device (522). At (7), the BMC (512) performs a lookup in the authentication database (514) to identify a public key associated with the identified manufacturer. At (8), the BMC (512) uses the public key found in the authentication database (514) to successfully decrypt a message in the provided certificate, thereby authenticating the PCIe device (522). Accordingly, the BMC (512) sends a command to the PCIe root port (520) (via SMBus (518)) to open all peripheral communication channels with the PCIe device (522).

At (9), the PCIe root port (520) receives the command from the BMC (512) and opens communication with the PCIe device (522). At (10), the PCIe root port (520) sends an interrupt to the OS (504) informing of the PCIe device (522) insertion into the node (500) (via Processor (510) on which the OS (504) is executing). Although the PCIe device (522) was inserted into the node (500) at (1), the OS (504) is not made aware of the PCIe device (522) until the PCIe root port (520) sends the interrupt.

At (11) and (12), the OS (504) and the PCIe device (522) communicate via common PCIe protocols without any additional filtering, blocking, and/or masking performed by the PCIe root port (520).

Figure 6:
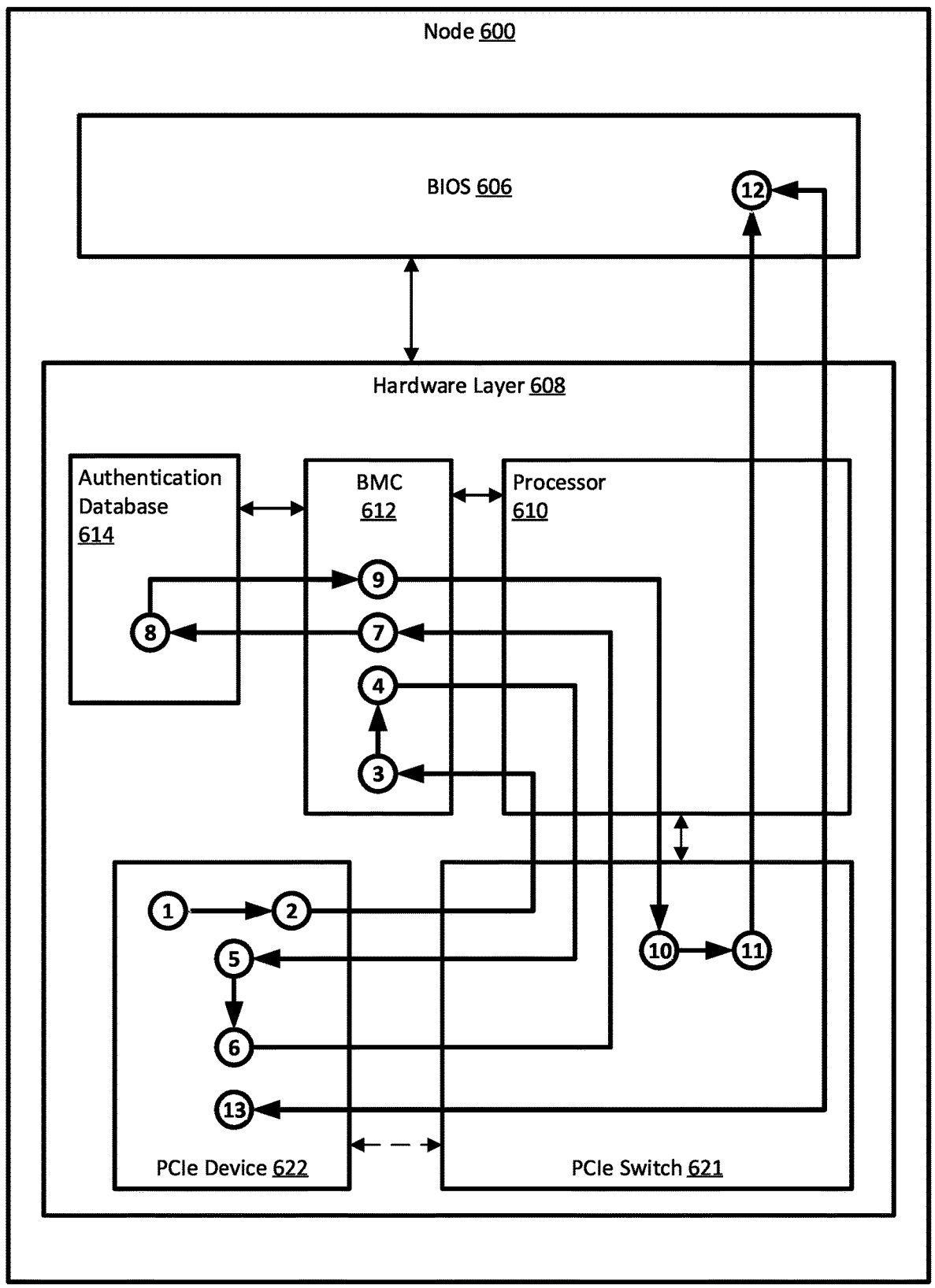
FIG. 6 shows an example of a method of authenticating a peripheral device, in accordance with one or more embodiments of the invention.

FIG. 6 shows an example of a method of authenticating a peripheral device, in accordance with one or more embodiments of the invention. The following use case is for explanatory purposes only and not intended to limit the scope to this embodiment.

In FIG. 6, consider a scenario in which—

At (1), node (600) is powered on and begins to initialize. The PCIe device (622) is already physically inserted into the hardware layer (608) of the node (600). The physical presence of the PCIe device (622) causes the physical presence pin of the PCIe port to become active. Most peripheral communication types between the PCIe device (622) and the PCIe switch (621) are disabled by default, however the PCIe switch (621) allows VDM to be transmitted to-and-from the PCIe device (622).

At (2), the PCIe device (622) generates a VDM that advertises that the PCIe device (622) is connected to the node (600) and sends the message to BMC (612) via PCIe switch (621) using software (not shown) executing on the processor (610) that enables communication between the BMC (612) and the PCIe switch (621).

At (3), the BMC (612) receives the message from the PCIe switch (621) specifying the PCIe device (622) identifying information and allowed VDM channel. In turn, at (4), the BMC (612) generates a request for the authentication credentials and identifying information of the PCIe device (622). The BMC (612) specifies the message as a VDM and (612) sends the request to the PCIe device (622) via the processor (610) (utilizing the same method the peripheral switch used to send the message at (2)).

At (5), the PCIe device (622) receives the request for authentication credentials and identifying information from the BMC (612). In turn, at (6), PCIe device (622) generates a message with data encrypted by its own private key, a manufacturer, and a model number and sends that message to the BMC (612) via the processor (610).

At (7), the BMC (612) receives the message with the encrypted data, manufacturer, and model number from the PCIe device (622). At (8), the BMC (612) performs a lookup in the authentication database (614) to identify a public key associated with the identified manufacturer. At (9), the BMC (612) uses the public key found in the authentication database (614) to successfully decrypt the encrypted data in the message, thereby authenticating the PCIe device (622). Accordingly, the BMC (612) sends a command to the PCIe switch (621) (via processor (610)) to open all peripheral communication channels with the PCIe device (622).

At (10), the PCIe switch (621) receives the command from the BMC (612) and opens communication with the PCIe device (622). At (11), the PCIe switch (621) informs the BIOS (606) that the PCIe device (622) is active and available (via processor (610) on which the BIOS (606) is executing). Although the PCIe device (622) was present into the node (600) at (1), the BIOS (606) is not made aware of the PCIe device (622) until the PCIe switch (621) informs the BIOS (606) of the PCIe device (622).

At (12) and (13), the BIOS (606) and the PCIe device (622) communicate via common PCIe protocols without any additional filtering, blocking, and/or masking performed by the PCIe switch (621).

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for authenticating a peripheral device, comprising:
    generating, by the peripheral device, a vendor defined message (VDM) that advertises that the peripheral device is connected to a node, wherein the peripheral device comprises a peripheral component interconnect express (PCIe) device;
    sending, by a PCIe switch of the node using software executing on a processor of the node, the VDM to a baseboard management controller (BMC) of the node;
    receiving, by the BMC, the VDM specifying identifying information associated with the peripheral device and an allowed VDM channel for communication;
    in response to receiving the VDM, generating, by the BMC, a request for authentication credentials and for identifying information of the peripheral device and placing the peripheral device in quarantine wherein, when in quarantine, the peripheral device can only communicate with the BMC over the allowed VDM channel;
    sending the request to the peripheral device by the PCIe switch of the node using the software executing on the processor of the node through the allowed VDM channel;
    receiving, by the peripheral device, the request;
    in response to receiving the request, generating a message by the peripheral device, wherein the message comprises the authentication credentials and the identifying information;
    sending the message to the BMC by the PCIe switch of the node using the software executing on the processor of the node through the allowed VDM channel;
    receiving, by the BMC, the message;
    obtaining, by the BMC and using at least a portion of the identifying information, a public key associated with the peripheral device;
    making a determination, based on the authentication credentials and the public key, that the peripheral device is authentic; and
    removing, in response to the determination, the peripheral device from the quarantine, wherein removing the peripheral device from the quarantine comprises:
        sending:
            a command to open a first peripheral communication channel with the peripheral device, and
            a certificate to the peripheral device generated by the BMC acting as a certificate authority so that the peripheral device may use the certificate for future authentications,
            wherein the command to open the first peripheral communication channel is sent to the PCIe switch via the processor,
            wherein prior to making the determination that the peripheral device is authentic, a plurality of peripheral communication channels are blocked, wherein the plurality of peripheral communication channels comprises the first peripheral communication channel.

2. A non-transitory computer readable medium comprising instructions which, when executed by a computer processor, enables the computer processor to perform a method for authenticating a peripheral device, comprising:
    generating, by the peripheral device, a vendor defined message (VDM) that advertises that the peripheral device is connected to a node, wherein the peripheral device comprises a peripheral component interconnect express (PCIe) device;
    sending, by a PCIe switch of the node using software executing on a processor of the node, the VDM to a baseboard management controller (BMC) of the node;
    receiving, by the BMC, the VDM specifying identifying information associated with the peripheral device and an allowed VDM channel for communication;
    in response to receiving the VDM, generating, by the BMC, a request for authentication credentials and for identifying information of the peripheral device and placing the peripheral device in quarantine wherein, when in quarantine, the peripheral device can only communicate with the BMC over the allowed VDM channel;

sending the request to the peripheral device by the PCIe switch of the node using the software executing on the processor of the node through the allowed VDM channel;

receiving, by the peripheral device, the request;

in response to receiving the request, generating a message by the peripheral device, wherein the message comprises the authentication credentials and the identifying information;

sending the message to the BMC by the PCIe switch of the node using the software executing on the processor of the node through the allowed VDM channel;

receiving, by the BMC, the message;

obtaining, by the BMC, and using at least a portion of the identifying information, a public key associated with the peripheral device;

making a determination, based on the authentication credentials and the public key, that the peripheral device is authentic; and removing, in response to the determination, the peripheral device from the quarantine, wherein removing the peripheral device from the quarantine comprises: sending:
    a command to open a first peripheral communication channel with the peripheral device, and
    a certificate to the peripheral device generated by the BMC acting as a certificate authority so that the peripheral device may use the certificate for future authentications,
    wherein the command to open the first peripheral communication channel is sent to the PCIe switch via the processor,
    wherein prior to making the determination that the peripheral device is authentic, a plurality of peripheral communication channels are blocked, wherein the plurality of peripheral communication channels comprises the first peripheral communication channel.

3. A node, comprising:

a processor;

a peripheral device;

a peripheral switch; and a baseboard management controller (BMC), wherein the BMC is configured to perform a method for authenticating the peripheral device, comprising:
    generating, by the peripheral device, a vendor defined message (VDM) that advertises that the peripheral device is connected to a node, wherein the peripheral device comprises a peripheral component interconnect express (PCIe) device;
    sending, by a PCIe switch of the node using software executing on a processor of the node, the VDM to a baseboard management controller (BMC) of the node;
    receiving, by the BMC, the VDM specifying identifying information associated with the peripheral device and an allowed VDM channel for communication;
    in response to receiving the VDM, generating, by the BMC, a request for authentication credentials and for identifying information of the peripheral device and placing the peripheral device in quarantine wherein, when in quarantine, the peripheral device can only communicate with the BMC over the allowed VDM channel;
    sending the request to the peripheral device by the PCIe switch of the node using the software executing on the processor of the node through the allowed VDM channel;
    receiving, by the peripheral device, the request;
    in response to receiving the request, generating a message by the peripheral device, wherein the message comprises the authentication credentials and the identifying information;
    sending the message to the BMC by the PCIe switch of the node using the software executing on the processor of the node through the allowed VDM channel;
    receiving, by the BMC, the message;
    obtaining and using at least a portion of the identifying information, a public key associated with the peripheral device;
    making a determination, based on the authentication credentials and the public key, that the peripheral device is authentic; and
    removing, in response to the determination, the peripheral device from the quarantine, wherein removing the peripheral device from the quarantine comprises: sending:
        a command to open a first peripheral communication channel with the peripheral device, and
        a certificate to the peripheral device generated by the BMC acting as a certificate authority so that the peripheral device may use the certificate for future authentications,
        wherein the command to open the first peripheral communication channel is sent to the PCIe switch via the processor,
        wherein prior to making the determination that the peripheral device is authentic, a plurality of peripheral communication channels are blocked, wherein the plurality of peripheral communication channels comprises the first peripheral communication channel.

4. The method of claim 1, wherein the identifying information specifies a manufacturer of the peripheral device, and a model number of the peripheral device.

5. The method of claim 1, further comprising:

in response to receiving the command, the PCIe switch sends an interrupt to an operating system (OS) on the node, wherein the BMC is located on the node, wherein the OS is not aware of the peripheral device prior to receiving the interrupt, wherein after receiving the interrupt, the OS is able to communicate with the peripheral device.

6. The non-transitory computer readable medium of claim 2, wherein the identifying information specifies a manufacturer of the peripheral device, and a model number of the peripheral device.

7. The non-transitory computer readable medium of claim 2, further comprising:

in response to receiving the command, the PCIe switch sends an interrupt to an operating system (OS) on the node, wherein the BMC is located on the node, wherein the OS is not aware of the peripheral device prior to receiving the interrupt, wherein after receiving the interrupt, the OS is able to communicate with the peripheral device.

8. The node of claim 3, wherein the identifying information specifies a manufacturer of the peripheral device, and a model number of the peripheral device.

9. The node of claim 3, further comprising:
in response to receiving the command, the PCIe switch sends an interrupt to an operating system (OS) on the node,
wherein the BMC is located on the node, wherein the OS is not aware of the peripheral device prior to receiving the interrupt,
wherein after receiving the interrupt, the OS is able to communicate with the peripheral device.

* * * * *